United States Patent Office 3,539,662
Patented Nov. 10, 1970

3,539,662
THERMOPLASTIC ALLOYS OF FINELY DIVIDED POLYLACTAMS POLYMERIZED WITH ALKALINE CATALYST AND COCATALYST IN A HIGH MOLECULAR WEIGHT OLEFINIC POLYMER MATRIX AND METHOD OF PREPARATION
Robert W. Hill, Leawood, Raymond P. Anderson, Prairie Village, and Stanley V. Scroggins, Olathe, Kans., assignors to Gulf Research & Development Company, Pittsburgh, Pa., a corporation of Delaware
No Drawing. Filed July 12, 1968, Ser. No. 744,333
Int. Cl. C08g 41/04
U.S. Cl. 260—857
9 Claims

ABSTRACT OF THE DISCLOSURE

An alloy of thermoplastic polymers is prepared by making a fine dispersion of a lactam monomer, such as caprolactam, in a matrix of high molecular weight polyethylene or ethylene copolymers, such as ethylene-vinyl pyrrolidone, ethylene-vinyl acetate, ethylene-lower alkyl acrylates, or ethylene-lower alkyl methacrylates, then an alkaline catalyst, in particular alkali metals or their hydroxides or organo metallic compounds such as Grignard reagents, and cocatalyst, such as an N-acyl caprolactam, are added to polymerize the lactam. This process results in a ready prepared solid nylon-polyethylene or polyethylene copolymer suspension, useful as a polymer alloy combining properties of polyethylene or polyethylene copolymers with properties of nylon, and as a means of fabricating high-viscosity nylon. Dispersion is improved by adding a dispersion agent, such as a high molecular weight polyethylene glycol.

BACKGROUND OF INVENTION

The graft polymerization using alkaline catalysis of caprolactam onto polymer chains containing reactive sites has been reported in U.S. Pat. No. 3,136,738. The present invention does not include graft polymerization.

Suspension polymerization of caprolactam in molten Wood metal or polyethylene of low molecular weight is known in Netherlands application No. 6,405,469, filed Nov. 19, 1964. By suspending caprolactam and the catalyst and cocatalyst in molten polyethylene in the upper part of a reactor which is maintained at 215° C. the caprolactam polymerizes and settles to the bottom of the reactor which is maintained below the melting point of the polycaprolactam. The polycaprolactam pellets thus obtained are recovered and the polmerization is completed in an oven at 150° C.

U.S. Pat. No. 3,298,977 to Robertson, et al. discloses suspension polymerization of lactam in an organic solvent using a small amount of polymeric suspending ingredient dissolved in the organic solvent. This polymeric suspending ingredient can be polymers or copolymers of olefinic hydrocarbons, including polyethylene and polyethylene copolymers. However, only 0.01 to 10 parts of polymeric suspending ingredient per 100 parts of lactam monomer is employed. Thus, the suspension polymerization is carried on in solvent. The polymeric product obtained is in the form of a finely divided suspension or dispersion of the polymeric product in the particular solvent employed.

SUMMARY

A new thermoplastic polymer alloy of finely divided polylactam polyemrized with alkaline catalyst and cocatalyst in a high molecular weight polymer matrix and a novel polymerization process for preparing this alloy results in an article of manufacture which combines properties of polyethylene or copolymers of ethylene with the properties of nylon. The novel process makes it possible to take advantage of the excellent physical properties of alkaline polymerized polylactams and the high rate of polymerization. Alkaline polymerized polylactams are normally of such high molecular weight that they can not be worked. However, the alloy of this invention can be useful for molding, extrusion or coating. By removing the matrix material the alloy may be used to prepare a fine nylon powder also useful for molding, extrusion or coating. This alloy may be extruded into tape which, after drawing, may be treated with hot solvent, thereby removing the matrix material and leaving nylon fibers.

PREFERRED EMBODIMENTS

The matrix

Materials used as the matrix are high molecular weight polyethylene and ethylene copolymers such as ethylene-lower alkyl acrylates, ethylene-lower alkyl methacrylates, ethylene-vinyl pyrrolidone, and ethylene-vinyl acetate. These matrix materials should be of high molecular weight, i.e., above about 10,000, in order to obtain the best physical properties of the alloy.

The polylactams

Any lactam can be suspended and polymerized by the method of this invention. The preferred polylactams are nylon 4, nylon 5, nylon 6, nylon 11 and nylon 12. Nylon 6 or polycaprolactam has been found particularly effective.

The polymerization system

The polymerization system consists of caprolactam, an alkaline catalyst and a cocatalyst. The alkaline catalyst may be any of a wide variety of alkaline catalysts mentioned in the literature, in particular alkali metals or their hydroxides or organo metallic compounds such as Grignard reagents. See for example, U.S. Pat. No. 3,298,-977, column 3, lines 50–64, hereby incorporated by reference. The cocatalyst may consist of any of a wide variety of cocatalysts reported in the literature, in particular N-acyl caprolactams such as N-acetyl caprolactam. See, for example, U.S. Pat. No. 3,298,977, column 3, line 65 to column 4, line 39, hereby incorporated by reference.

Preparation of dispersion

The caprolactam-polyethylene dispersion is prepared in a device suitable for mixing viscous materials at elevated temperature such as a Brabender variable speed Plasti-Corder. The dispersion of caprolactam may be prepared at temperatures ranging from 120° to over 270° C., but preferably at 150–180° C. As the time required for preparing the dispersion is greater than the time required for polymerization, the caprolactam is preferably dispersed in the polyethylene before the catalyst and cocatalyst are added.

The caprolactam may be dispersed in the above mentioned ethylene copolymers more readily than it may be dispersed in polyethylene.

Up to 40% caprolactam may be dispersed in the above mentioned copolymers without the use of additional agents.

Addition of small amounts of a dispersing agent, preferably polyethylene glycol, such as Polyox FRA (Union Carbide) allows more ready dispersion of the caprolactam and dispersions containing up to 60% caprolactam may be obtained. Many of the conventional dispersing agents should be effective to aid dispersion of the lactam in the matrix material. Dodecyltrimethylammonium chloride and pyrogenic colloidal silica have been found effective. Also, a highly uniform copolymer of ethylene with acrylic acid containing about 20% by weight of acrylic acid was found effective, so long as excess alkaline catalyst is used in the polymerization step so that the acid copolymer does not neutralize most of the catalyst and thus interfere with the polymerization. The preferred mixing process is to place the lactam and 0.1–10%, by weight of the polyethylene glycol in the Brabender at 160–180° C. and, with the mixing blades on, gradually add the high molecular weight polyethylene (or copolymer) and continue mixing until dispersion is complete.

Polymerization

After the lactam-matrix material dispersion is prepared, the polymerization is carried out by the addition of the catalyst and cocatalyst. In the preferred procedure the co-catalyst is first added and mixed throughout the dispersion followed by addition of the catalyst. The catalyst may be added as the metal caprolactam salt (such as sodium caprolactam) prepared previously, or the caprolactam salt may be generated in situ; for example, by the addition of an ether solution of phenyl magnesium bromide to the caprolactam-polyethylene dispersion. After the catalyst is added, the mixing is continued until polymerization is complete.

Simultaneous dispersion and polymerization; above the nylon's metling point

In the Brabender mixer.—In this process, the molten inert matrix phase is heated to 230–270° C. To this is added a mixture containing lactam, an alkaline catalyst and a cocatalyst. In this process the lactam is polymerizing as the dispersion takes place; dispersions containing up to 70% nylon may be prepared.

In an extruder.—In this process a mixture containing matrix material pellets or powder, lactam, catalyst and cocatalyst are fed simultaneously into an extruder heated to above the melting point of nylon. The extruded material is a dispersion of nylon in polyethylene.

Preparation of a powdered polyethylene-lactam dispersion

In this process the matrix material and a polyethylene glycol (10% by weight) are mixed in a Brabender above 120°. To this is slowly added lactam. After dispersion is complete, the Brabender is allowed to cool while the mixing is continued. A finely powdered dispersion of lactam in polyethylene results. This material may be dry blended with a catalyst and cocatalyst, after which it may be polymerized in an extruder or Brabender mixer.

EXAMPLE I

Two hundred and forty eight grams of dry caprolactam was charged to a Brabender Plasti-Corder mixing head heated to 180° C. Two and eight-tenths grams of a high molecular weight polyethylene glycol (Polyox FRA (Union Carbide), was added to aid dispersion of the caprolactam in an ethylene- (97.5% by weight) vinylpyrrolidone (2.5% by weight) copolymer. Two hundred and twenty six grams of the ethylenevinylpyrrolidone copolymer was added and mixing was continued until dispersion was complete. All mixing was carried out under a nitrogen blanket. N-acetyl caprolactam (7.5 ml.) was added and mixing was continued for four minutes. This was followed by the careful addition of 15 ml. of a three molar solution of phenylmagnesium bromide in ether. Twenty five minutes were allowed to complete the polymerization. The infrared spectrum of the alloy obtained showed strong absorption bands characteristic of nylon 6.

EXAMPLE II

A reaction mixture containing caprolactam, catalyst and cocatalyst was prepared by adding 0.35 g. of N-acetyl caprolactam to 25.4 grams of caprolactam and heating to approximately 75° C. to melt the caprolactam. After melting one ml. of a 3 molar solution of phenylmagnesium bromide in ether was added. This reaction mixture was then added to 30 grams of a molten ethylene- (97.5% by weight) vinylpyrrolidone (2.5% by weight) copolymer held in a Brabender Plasti-Corder mixing head at 255° C. under a nitrogen blanket. The materials were readily mixed and were retained in the mixing head for 18 minutes. The infrared spectrum of the resulting allow showed strong bands characteristic of nylon 6. Melting of the alloy was complete at 225° C.

EXAMPLE III

A reaction mixture containing caprolactam, catalyst and cocatalyst was prepared by reacting 0.03 gram of sodium with 20.5 grams of dry caprolactam under nitrogen at 100° C. N-acetyl caprolactam (0.24 gram) was added. Sixteen and six-tenths grams of the above reaction mixture was placed in a Brabender mixing head with 25 grams of an ethylene- (97.5% by weight) vinylacetate (2.5% by weight) copolymer. Polymerization occurred before dispersion was complete, resulting in some macroscopic chunks of solid nylon in addition to finely divided particles of nylon suspended in the polyethylene matrix. Thus, it is more convenient to prepare the dispersion before adding the sodium catalyst in order to avoid formation of chuks of nylon.

EXAMPLE IV

A dispersion of 300 grams of caprolactam in 200 grams of an ethylene- (95% by weight) vinylacetate (5% by weight) copolymer was prepared in a Brabender Plasti-Corder mixing head at 155° C. Four grams of a highly uniform ethylene-acrylic acid copolymer containing about 20% by weight of acrylic acid were added to aid in preparing the dispersion. Sodium caprolactam which was prepared by reacting 3.2 grams of sodium with 22.9 grams of caprolactam, under nitrogen, at 120° C. was added to the dispersion. (Excess catalyst was used because of partial destruction of the catalyst by the ethylene-acrylic acid copolymer. After mixing was complete, 4.0 g. of N-acetyl caprolactam was added. A large viscosity increase was noted soon after addition of the cocatalyst. After 35 minutes the alloy was removed from the mixing head. The alloy showed a softening point below 100° C. but complete melting did not occur until 220° C. The ethylene copolymer could be removed by treatment with hot xylene leaving a finely divided nylon 6 powder, melting point 216–220° C.

We claim:

1. The method of preparing a solid alloy of thermoplastic polylactam suspended in a matrix material having a molecular weight above 10,000 selected from the group consisting of high molecular weight polyethylene and copolymers of predominantly ethylene with a lower alkyl acrylate, with a lower alkyl methacrylate, with vinyl acetate, and with vinyl pyrrolidone, consisting of dispersing in said matrix material up to 60 percent by weight of a lactam monomer, based on total weight of both lactam and matrix material at a temperature of from about 120° to 270° C. with a conventional device suitable for mixing viscous materials at elevated temperatures, adding a conventional cocatalyst, adding alkaline catalyst, then mixing until anionic polymerization of lactam is complete.

2. The method of claim 1 wherein the temperature range is about 150 to about 180° C.

3. The method of claim 1 wherein small amounts of a dispersing agent selected from the group consisting of polyethylene glycol, pyrogenic colloidal solica, dodecyltrimethylammonium chloride and a coplymer of ethylene with acrylic acid is added as a dispersing aid.

4. The method of claim 1 wherein small amounts of a polyethylene glycol is added as a dispersing aid.

5. The method of claim 4 wherein 0.1 to 10% by weight of a polyethylene glycol is added as a dispersion aid.

6. The method of claim 1 wherein said matrix material is heated to 230 to 270° C., then lactam monomer, alkaline catalyst, and cocatalyst is added so that the lactam is polymerized as the dispersion takes place.

7. The method of claim 1 wherein a mixture of matrix material in particulate form, lactam monomer in particulate form, alkaline catalyst, and cocatalyst are fed simultaneously into an extruder heated to above the melting point of the polylactam.

8. The method of claim 1 wherein said cocatalyst is mixed thoroughly in said dispersion of lactam monomer in said matrix material before said alkaline catalyst is added.

9. The method of preparing a solid alloy of thermoplastic polylactam suspended in a matrix material having a molecular weight above 10,000 selected from the group consisting of:

high molecular weight polyethylene and copolymers of predominantly ethylene with lower alkyl acrylates, with lower alkyl methacrylates, which vinyl pyrrolidone and with vinyl acetate, consisting of mixing said matrix material and polyethylene glycol at temperatuers between 120° C. and 270° C. slowly adding up to 60 percent by weight, lactam monomer, based on total weight of lactam and matrix material, then after dispersion is complete, cooling said dispersion while mixing is continued so that a finely powdered dispersion of lactam monomer in matrix material results, then dry blending said powdered dispersion with an alkaline catalyst and cocatalyst, then finally anionic polymerizing said dry blend of powdered dispersion with catalyst and cocatalyst at elevated temperture in a device suitable for mixing viscous materials.

References Cited
UNITED STATES PATENTS

| | | | |
|---|---|---|---|
| 3,298,977 | 1/1957 | Robertson | 260—857 |
| 3,379,698 | 4/1968 | Bigot | 260—857 |
| 3,408,335 | 10/1968 | Mourik | 260—857 |
| 3,451,975 | 6/1969 | Gaspar | 260—857 |

PAUL LIEBERMAN, Primary Examiner

U.S. Cl. X.R.

260—78